United States Patent

Tanaka et al.

[11] Patent Number: 5,995,886
[45] Date of Patent: Nov. 30, 1999

[54] SYSTEM FOR ESTIMATING RESIDUAL SERVICE TIME OF WORK VEHICLE

[75] Inventors: Yasuo Tanaka, Tsukuba; Yoshinori Furuno; Yutaka Watanabe, both of Tsuchiura; Takashi Yagyu, Ushiku; Yukihiko Sugiyama, Tsuchiura, all of Japan

[73] Assignee: Hitachi Construction Machinery Co., Ltd., Tokyo, Japan

[21] Appl. No.: 08/914,235

[22] Filed: Aug. 19, 1997

[30] Foreign Application Priority Data

Aug. 30, 1996 [JP] Japan ................................ 8-230862

[51] Int. Cl.$^6$ ........................................ G06G 7/70
[52] U.S. Cl. ..................... 701/30; 701/123; 701/29; 73/113; 73/114; 340/457.4
[58] Field of Search .................... 701/29, 30, 31, 701/33, 123; 340/449, 457.4, 438, 439; 73/53.05, 117.3, 119 A, 861.81, 113, 114, 115; 123/445, 458, 459, 196 S, 514, 497; 702/130, 132, 176, 46, 163

[56] References Cited

U.S. PATENT DOCUMENTS

| | | | |
|---|---|---|---|
| 3,812,710 | 5/1974 | Bauman et al. | 73/114 |
| 4,054,781 | 10/1977 | Kuno et al. | 701/123 |
| 4,061,023 | 12/1977 | Kuno et al. | 701/123 |
| 4,157,030 | 6/1979 | Keely | 701/123 |
| 4,217,644 | 8/1980 | Kato et al. | 701/123 |
| 4,434,777 | 3/1984 | Straubel | 123/445 |
| 4,437,342 | 3/1984 | Hosaka et al. | 73/119 A |
| 4,446,727 | 5/1984 | Kurihara et al. | 73/113 |
| 4,525,782 | 6/1985 | Wohlfarth et al. | 701/35 |
| 5,060,156 | 10/1991 | Vajgart et al. | 701/30 |
| 5,743,239 | 4/1998 | Iwase | 123/514 |

FOREIGN PATENT DOCUMENTS

| | | |
|---|---|---|
| 59-98935 | 6/1984 | Japan . |
| 4-265434 | 9/1992 | Japan . |

*Primary Examiner*—Jacques H. Louis-Jacques
*Attorney, Agent, or Firm*—Beall Law Offices

[57] ABSTRACT

A system for the estimation of residual service time of a work vehicle includes an arithmetic and logic unit which is inputted with an engine speed and a speed difference from a controller for an engine, with a signal, which indicates whether or not at least one of several control levers has been operated, from a lever position detector, and also with a residual fuel quantity in a fuel tank from a converting device. The residual fuel quantity is determined at intervals of about 1 hour at the arithmetic and logic unit. Upon an elapse of each short period of time, a quantity of fuel consumed during said short time, said quantity being obtained based on a difference in engine speed, is subtracted from the residual fuel quantity, whereby a calculated residual fuel quantity is obtained. A quantity of fuel consumed from a preceding residual fuel quantity measurement period to a current residual fuel quantity measurement period is divided by the calculated residual fuel quantity to obtain a value. The residual fuel quantity is then divided by this value to compute a residual service time, which is then displayed on a display.

3 Claims, 14 Drawing Sheets

SYSTEM FOR ESTIMATING RESIDUAL SERVICE TIME OF WORK VEHICLE

BACKGROUND OF THE INVENTION

1. Field of the Invention

This invention relates to a system for estimating residual service time of a work vehicle, and more specifically to a system for estimating residual service time of a work vehicle such as a hydraulic excavator which digs out and removes earth, sand and broken rocks at a mine or the like.

2. Description of the Related Art

Work vehicles such as hydraulic excavators are employed to dig out earth, sand and the like and then to transport and remove them. As a great deal of load is applied to the work vehicles during such work, a variety of measures have been proposed concerning their maintenance and service [for example, Japanese Patent Application Laid-Open (Kokai) No. SHO 59-98935].

Different from general vehicles, work vehicles such as hydraulic excavators are often employed at sites remote from urban areas. If a work vehicle should run out of fuel for its engine, the work vehicle immediately stops. If this happens, it is no longer possible for the work vehicle to continue the work so that the efficiency of the work is considerably impaired.

On the other hand, a load which applies to a work vehicle substantially varies depending on the nature of work. This makes it difficult for an operator to estimate how much fuel would be consumed by the work vehicle. Therefore an operator often fails to refuel a work vehicle in time so that the work vehicle runs out of fuel and is no longer able to continue the work.

To avoid the above-mentioned running-out of fuel in work vehicles, many conventional work vehicles are equipped with a device which displays a warning sign or the like or generates a warning sound when the fuel level has decreased to such a level that the work vehicle can work only for an additional 1 hour under a maximum load. Based on the warning from the above-mentioned device, the operator requests refueling to a supervision center by a radio communication equipment or a mobile telephone. As another measure, a control system has been proposed which, as described in Japanese Patent Application Laid-Open (Kokai) No. HEI 4-265434, lowers an engine speed to a work-permitting minimum level to save the fuel consumption by a work vehicle when the fuel level has become low.

In a vast work site such as a strip (or open-pit) mine, many work vehicles are used from the viewpoint of improved productivity. Such a work site generally has several tank trucks available for refueling work vehicles. Each of these tank trucks visits its assigned work vehicles one after one to refuel them so that the work vehicles do not run out of fuel.

In the conventional device that produces warning when the fuel level has decreased to such a level as allowing a work vehicle to work only for additional 1 hour under a maximum load, the operator may ignore the warning and continue the work to achieve an improvement in productivity because he knows through experience that the fuel tank still contains fuel in an amount far more than that required for operating the work vehicle for 1 hour. In such a case, the work vehicle may not be refueled in time even if he requests refueling immediately after he becomes aware that the fuel level in the fuel tank has become low. As a result, the operator has no choice other than simply stopping the work until a tank trucks arrives. This problem has taken place frequently.

In the above-described conventional measure in which a tank truck visits and refuels work vehicles one after one, fuel is replenished to a fuel tank of each work vehicle to ensure avoidance of running-out of fuel even if a lot of fuel still remains in the fuel tank. More frequent refueling to the fuel tank is therefore needed than usual. As the work vehicle has to be stopped once upon each refueling, the more frequent refueling leads to an increase in work-suspending time. This has become a cause for an impaired efficiency of work. Especially at a site where a three-shift system is adopted, the serviceability ratio of work vehicles has reached 90% or still higher. In such a case, an increase in work-suspending time due to refueling leads directly to a reduction in the efficiency of work. To ensure avoidance of fuel running-out, it is essential to reserve tank trucks and their operators sufficiently. Extremely large expenses are therefore needed for such tank trucks and operators.

SUMMARY OF THE INVENTION

An object of the present invention is therefore to overcome the above-described problems of the conventional art and to provide a system for estimating residual service time of a work vehicle so that it becomes possible to estimate with high accuracy how many more hours the work vehicle can be operated.

Another object of the present invention is to overcome the above-described problems of the conventional art and to provide a system for estimating residual service time of a work vehicle so that reasonable refueling can be performed for the work vehicle.

To achieve the above-described objects, the present invention has adopted the following features:

(1) A system for estimating residual service time of a work vehicle, said system being arranged on the work vehicle having an engine, a fuel tank for storing fuel for the engine, a fuel meter for detecting a quantity of fuel in the fuel tank, an engine speed detector for detecting a speed of the engine, plural hydraulic pumps driven by the engine, a like plural number of hydraulic actuators driven by working oils delivered from the hydraulic pumps, respectively, and a like plural number of control levers for operating the hydraulic actuators, respectively, characterized in that the system comprises:

first computing means for computing an actually-consumed fuel quantity of the engine on a basis of a measurement value of the fuel meter during a predetermined period;

second computing means for determining an estimated fuel consumption quantity of the engine during each predetermined short time starting after the predetermined period;

third computing means for subtracting the estimated fuel consumption quantity from the actually-consumed fuel quantity after an elapse of each predetermined short time, whereby a current residual fuel quantity is determined and then outputted; and fourth computing means for dividing the estimated fuel consumption quantity from the second computing means by a ratio of the actually-consumed fuel quantity to an integrated value of the estimated fuel consumption quantity during the predetermined period, whereby a current residual service time is determined and then outputted.

(2) The system described above under (1), wherein the system further comprises:

first correction means for computing, as a first correction factor, the ratio of the actually-consumed fuel quantity to an integrated value of the estimated fuel consumption quantity during the predetermined period.

(3) The system described above under (2), wherein the system further comprises:

second correction means for correcting an absolute value of the first correction factor determined by the first correction means, whereby a second correction factor is determined.

(4) The system described above under (3), wherein the second correction means decreases the first correction factor when the ratio obtained during a current predetermined period is greater than a value of the first correction factor obtained by the first correction means in a preceding predetermined period, but increases the first correction factor when the ratio obtained in the current predetermined period is smaller than a value of the first correction factor obtained by the first correction means in the preceding predetermined period.

(5) The system described above under any one of (1) to (4), wherein the second computing means determines the estimated fuel consumption quantity on a basis of a product of a fuel consumption quantity of the engine per revolution as determined from a difference in speed of the engine and a speed of the engine during the predetermined short time.

(6) The system described above under any one of (1) to (4), wherein the second computing means determines the estimated fuel consumption quantity on a basis of a product of a lack displacement of the engine, a fuel consumption quantity of the engine per revolution as determined from an engine speed during the predetermined short time and the engine speed during the predetermined short time.

(7) The system described above under any one of (1) to (4), wherein the second computing means determines the estimated fuel consumption quantity by subtracting a return fuel quantity to the fuel tank from a supply fuel quantity to the engine.

(8) The system described above under (1), wherein the system further comprises a display for displaying the residual service time from the fourth computing means.

(9) The system described above under (1), wherein the system further comprises a display for displaying the residual service time from the fourth computing means and the residual fuel quantity from the third computing means.

(10) A system for estimating residual service time of a work vehicle, said system being arranged on said work vehicle having an engine, a fuel tank for storing fuel for the engine, a fuel meter for detecting a quantity of fuel in the fuel tank, plural hydraulic pumps driven by the engine, a like plural number of hydraulic actuators driven by working oils delivered from the hydraulic pumps, respectively, and a like plural number of control levers for operating the hydraulic actuators, respectively, characterized in that the system comprises:

first computing means for computing an actually-consumed fuel quantity of the engine on a basis of a measurement value of the fuel meter during a predetermined period;

second computing means for determining an estimated fuel consumption quantity of the engine during each predetermined short time starting after the predetermined period;

third computing means for subtracting the estimated fuel consumption quantity from the actually-consumed fuel quantity after an elapse of each predetermined short time, whereby a current residual fuel quantity is determined and then outputted; and fourth computing means for dividing the residual fuel quantity by a ratio of the actually-consumed fuel quantity to a driven time of each of the hydraulic actuators during the predetermined period, whereby a current residual service time is determined and then outputted.

(11) The system described above under (10), wherein the work vehicle further comprises:

computing means for computing the ratio of the actually-consumed fuel quantity to the driven time of each of the hydraulic actuators during the predetermined period, whereby the residual service time is determined.

(12) The system described above under (10) or (11), wherein the work vehicle further comprises:

a display for displaying the residual service time from the fourth computing means.

(13) The system described above under (10) or (11), wherein the work vehicle further comprises:

a display for displaying the residual service time from the fourth computing means and the residual fuel quantity from the third computing means.

Other features and advantages of the present invention will become more apparent from embodiments to be descried next.

DETAILED DESCRIPTION OF THE PREFERRED EMBODIMENTS

Figure 1:
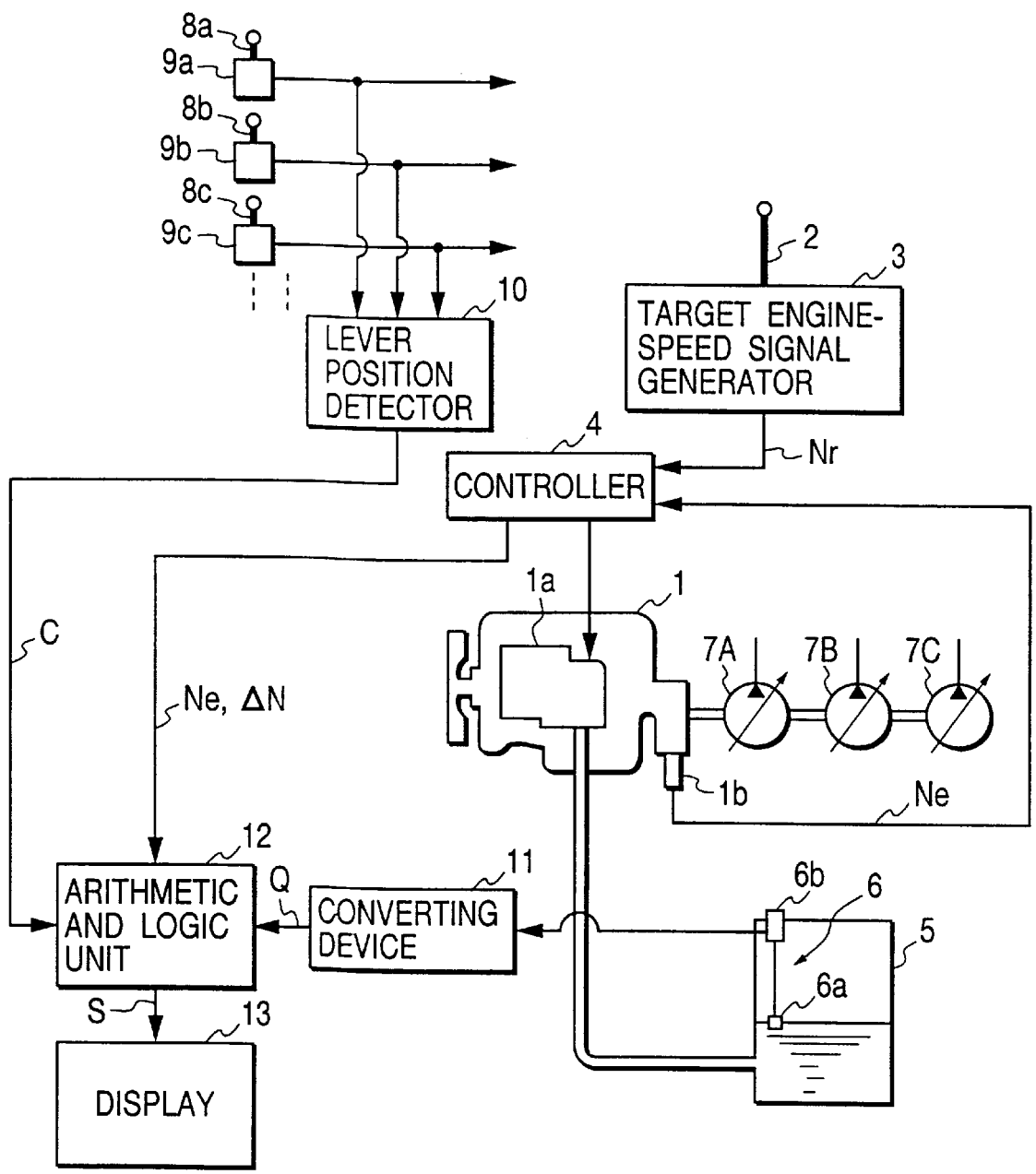
FIG. 1 is a block diagram of a system according to a first embodiment of the present invention for estimating residual service time of a work vehicle.

The present invention will hereinafter be described on the basis of the embodiments illustrated in the drawings.

The system according to the first embodiment of the present invention for estimating residual service time of the work vehicle will be described first with reference to FIG. 1, which shows an engine 1, a fuel injection pump 1a for the engine 1, and an electromagnetic pick-up 1b arranged opposite to a rotating part of the engine 1, such as a flywheel, for the detection of a speed Ne of the engine 1. In a work vehicle such as a hydraulic excavator, an all-speed-governor diesel engine is used as the engine 1. Designated at numeral 2 is a target engine-speed setting lever for setting a target speed Nr of the engine 1. Depicted at numeral 3 is a target engine-speed signal generator for outputting an electrical signal which is proportional to the target engine speed Nr set by the target engine-speed setting lever 2. Numeral 4 indicates a controller. This controller 4 is inputted with the target engine speed Nr and the engine speed Ne and the engine speed Ne and based on a difference therebetween (a difference $\Delta N$ in engine speed), controls the quantity of fuel to be injected through the fuel injection pump 1a so that the engine 1 is controlled to rotate a constant speed as close as possible to the target engine speed Nr.

Designated at numeral 5 is a fuel tank. Numeral 6 indicates a fuel level gauge for measuring a fuel level within the fuel tank 5. Also illustrated are a float 6a of the fuel level gauge 6 and a displacement detector 6b for detecting each displacement of the float 6a and then outputting an electrical signal corresponding to the displacement. As the fuel level gauge 6, one making use of an ultrasonic wave or laser beam instead of a float to measure a distance to a fuel level can also be used. Designated at 7A, 7B, 7C are variable-displacement hydraulic pumps (hereinafter simply called "the hydraulic pumps") driven by the engine 1, which supply pressure oils to hydraulic actuators to be described subsequently herein. Symbols 8a, 8b, 8c . . . indicate control levers for unillustrated hydraulic actuators which serve to drive a boom, an arm and a bucket, which make up a front device, travelling crawlers, a swivel and the like of the excavator. Symbols 9a, 9b, 9c . . . indicate pressure-reducing valves (pilot valves) for outputting pilot pressures, which correspond to strokes and operated directions of the respective control levers 8a, 8b, 8c . . . , to corresponding control valves (not shown), respectively.

Numeral 10 indicates a lever position detector for detecting states of operations of the control levers 8a, 8b, 8c . . . The detector 10 is constructed of shuttle valves, pressure switches, a logic circuit and the like, none of which are illustrated in the diagram. The detector 10 is inputted with pilot pressures from the respective pilot valves 9a, 9b, 9c . . . , and outputs an operation-state signal C corresponding to the respective control levers 8a, 8b, 8c . . . The operation-state signal C is ON (a high-level signal) when at least any one of the control levers 8a, 8b, 8c . . . has been operated but is OFF (a low-level signal) when all the control levers are in non-operated states. As the control levers, it is possible to use those constructed of electrical control levers, which make use of displacement sensors such as potentiometers, and capable of producing pilot hydraulic pressures corresponding to electrical signals. In this case, the lever position detector 10 is inputted with such respective electrical signals to determine the operation states of the individual control levers 8a, 8b, 8c . . .

Numeral 11 indicates a converting device for converting a displacement signal from a displacement detector 6b of the fuel level gauge 6 into a residual fuel quantity Q. In some instances, plural fuel level gauges 6 may be arranged in view of measurement of a fuel level while a main body of the work vehicle is in a tilted position. In such a case, the converting device 11 computes, based on signals from the individual fuel level gauges 6, what a fuel level would be if the work vehicle were in a horizontal position.

Designated at numeral 12 is an arithmetic and logic unit. This arithmetic and logic unit 12 is inputted with an engine speed Ne and a difference $\Delta N$ in engine speed from the controller 4, a signal C from the lever position detector 10 and a residual fuel quantity Q from the converting device 11, and computes residual service time and a residual fuel quantity moment by moment. Needless to say, the engine speed Ne can be introduced directly into the arithmetic and logic unit 12 from the electromagnetic pickup 1b.

Figure 2:
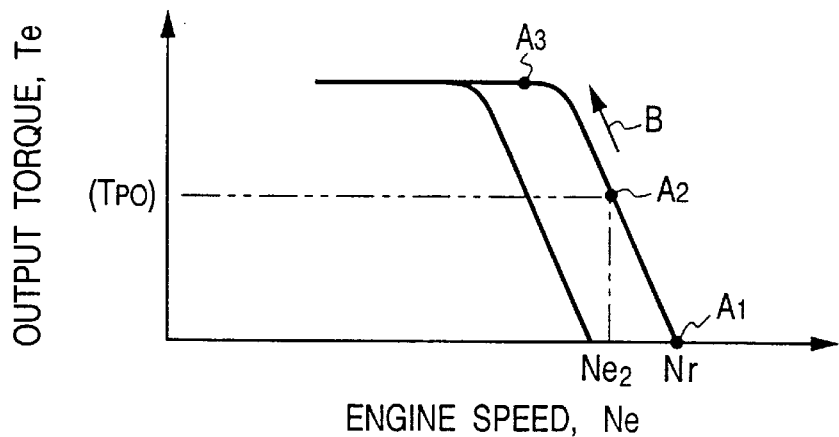
FIG. 2 is a characteristic diagram useful in the practice of the present invention, which illustrates output torque as a function of engine speed.

A description will now be made about a relationship between a speed Ne of the engine 1 and its output torque Te. FIG. 2 is the characteristic diagram illustrating engine output torque as a function of engine speed. In the diagram, engine speeds Ne are plotted along the abscissa and engine output torques Te are plotted along the ordinate. When there is absolutely no load applied to the engine 1, the engine 1 rotates at a target speed Nr as indicated at point $A_1$. When the sum of loads applied to the hydraulic pump 7A and the like is $T_{po}$ as shown in the diagram, the controller 4 increases the fuel injection quantity to increase the output torque Te of the engine 1 so that the output torque Te of the engine 1 and the absorbed torque $T_{po}$ of the hydraulic pump 7A and the like are balanced with each other. As a result, the engine 1 rotates at a speed $Ne_2$ as indicated at a point $A_2$. The speed $Ne_2$ is lower than the target engine speed Nr. When the load applied to the hydraulic pump 7A and the like increases further, the balancing point between the output torque Te of the engine 1 and the absorbed torque $T_p$ of the hydraulic pump 7A and the like progressively shifts in a direction indicated by an arrow B, and reaches a point $A_3$ where the output of the fuel injection pump 1a reaches the maximum. Assume that the load increases further from this state. As the output of the fuel injection pump 1a does not increase, the output of the engine 1 does not increase either. Therefore the speed of the engine 1 progressively drops so that the engine 1 eventually stops. The controller 4 uses an engine speed difference $\Delta N$ for the control of the fuel injection pump 1a, so that the fuel injection quantity is increased as the engine speed difference $\Delta N$ becomes greater but is decreased as the engine speed difference $\Delta N$ becomes smaller.

Figure 3:
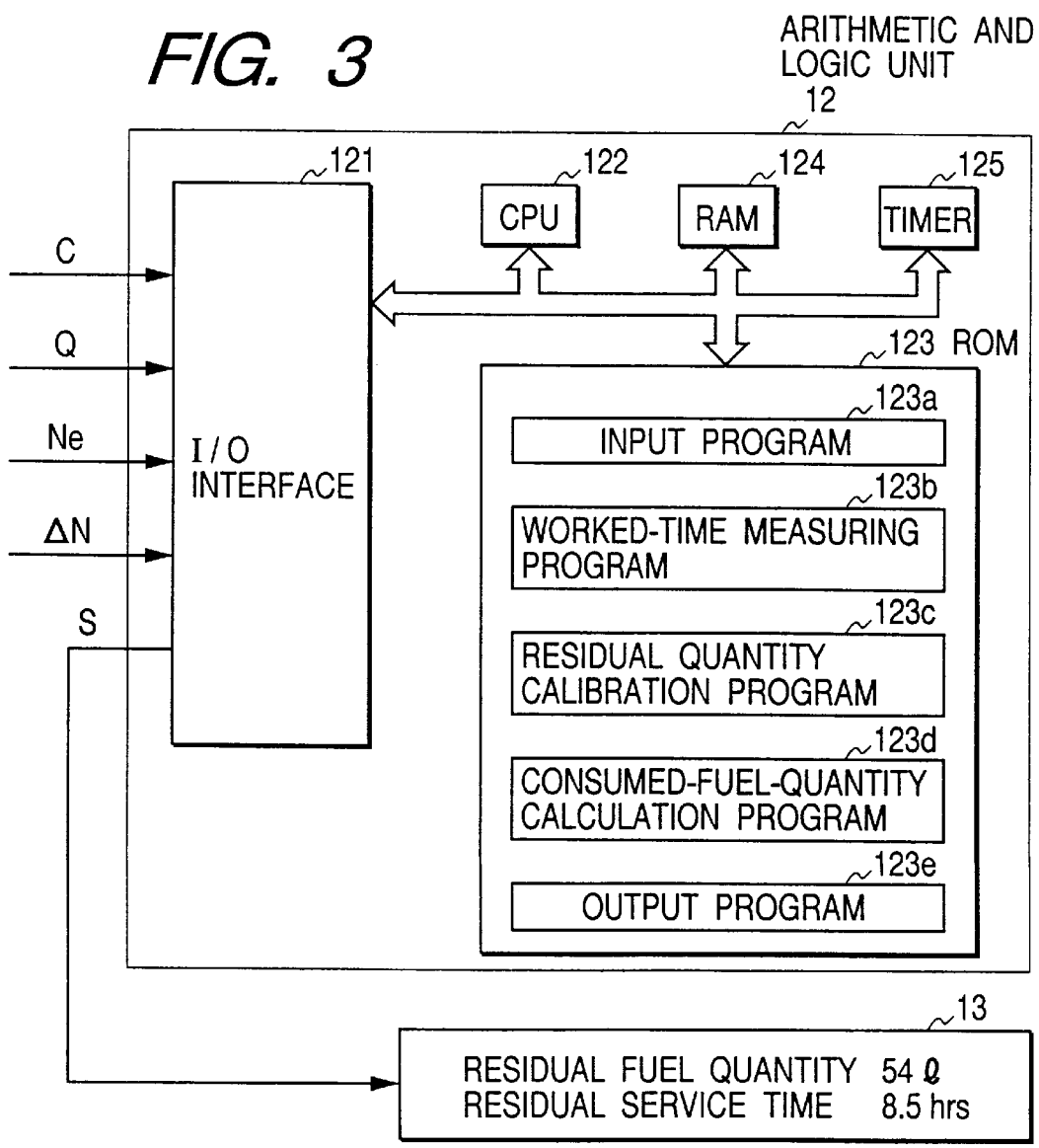
FIG. 3 is a system configuration diagram of an arithmetic and logic unit in the system of the present invention shown in FIG. 1.

Next, the construction of the arithmetic and logic unit 12 shown in FIG. 1 will be described with reference to FIG. 3. FIG. 3 is the system configuration diagram of the arithmetic and logic unit. In the diagram, numeral 121 indicates an I/O interface provided with an A/D converter and a D/A converter. This I/O interface 121 performs input of an operation state signal C, a residual fuel quantity Q, an engine speed Ne and an engine speed difference $\Delta N$ and also conducts input and output of a signal S. Also illustrated are a central processing unit (CPU) 122 for performing predetermined computation and control, a read only memory (ROM) 123 with procedures and the like for CPU 122 stored therein, a random access memory (RAM) 124 for storing results and the like of computation and control, and a timer 125 for outputting time data. As is illustrated in the diagram, ROM 123 is equipped with an input program 123a, a worked-time measuring program 123b, a residual quantity calibration program 123c, a consumed-fuel-quantity calculation program 123d, and an output program 123e. In FIG. 3, the display 13 and its illustrative display are shown. The illustrative display indicates that the residual fuel quantity and the residual service time are 54 liters and 8.5 hours, respectively.

Next, operation of the system according to the first embodiment of the present invention will be described with reference to the flow charts shown in FIGS. 4, 6, 7 and 8 and the characteristic diagram illustrated in FIG. 5.

Pursuant to an instruction from CPU 122, the input program 123a inputs a desired signal or signals of an operation state signal C, a residual fuel quantity Q, an engine speed Ne and an engine speed difference $\Delta N$ and converts the signal or signals into a digital value or values.

Figure 4:
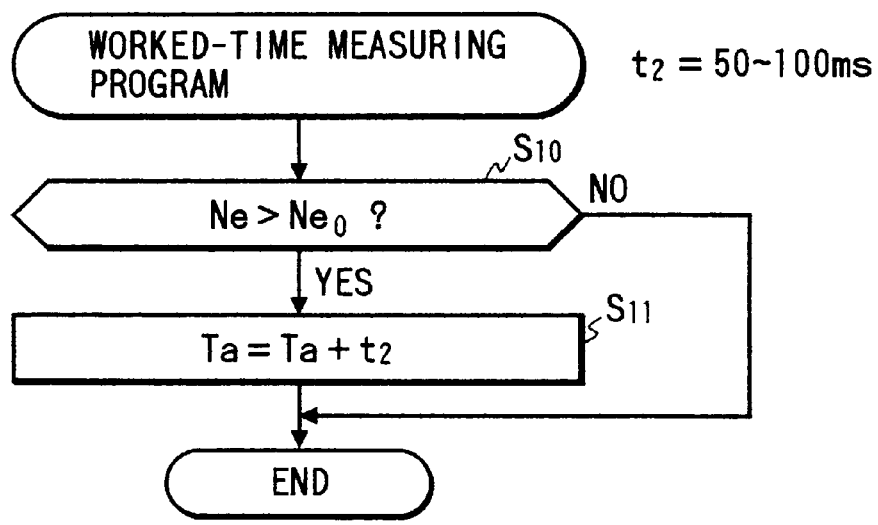
FIG. 4 is a flow chart illustrating operation of the arithmetic and logic unit under a worked-time measuring program in the system of the present invention shown in FIG. 1.

The worked-time measuring program 123b is executed at a constant interval $t_2$, for example, at a constant interval of from 50 to 100 msec as shown in FIG. 4. It is first determined whether or not the inputted engine speed Ne is greater than a predetermined engine speed $Ne_o$ (step $S_{10}$). Since the engine is operated in a speed range of from 1,000 to 2,500 rpm when a hydraulic excavator is used as the work vehicle, the above engine speed $Ne_o$ is set, for example, at 600 rpm ($Ne_o$=600 rpm). If the engine speed Ne is higher than the predetermined engine speed $Ne_o$, the engine 1 is determined to be in a driven state, the execution interval $t_2$ is added to a preceding integrated engine operation time to calculate a current integrated engine operation time Ta (step $S_{11}$), and the processing is ended. If the engine speed Ne is equal to or lower than the predetermined engine speed $Ne_o$, the engine 1 is not determined to be in a driven state and the processing is ended. Upon an elapse of the interval $t_2$, the program 123b is executed again.

Figure 5:
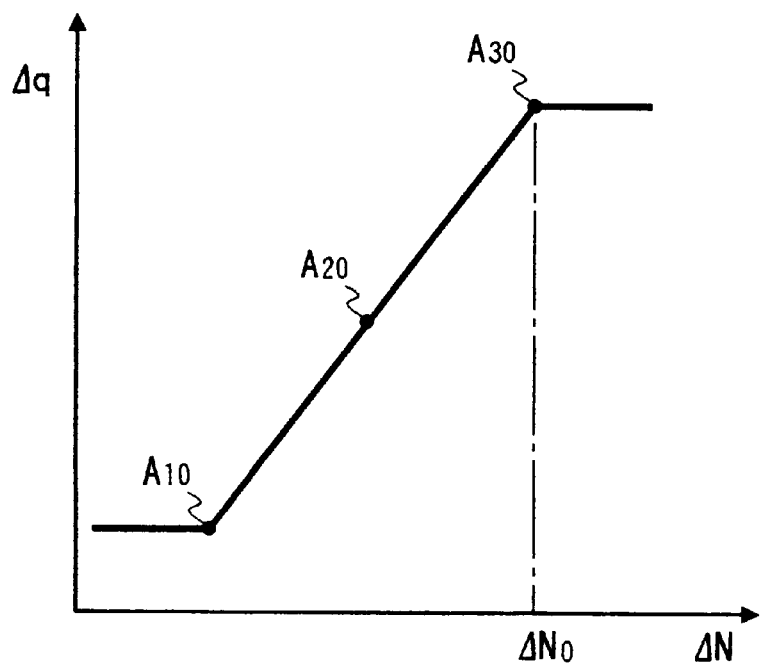
FIG. 5 is a characteristic diagram for use in the arithmetic and logic unit in the system of the present invention shown in FIG. 1, which illustrates a difference in engine speed as a function of a fuel consumption quantity.
Figure 6:
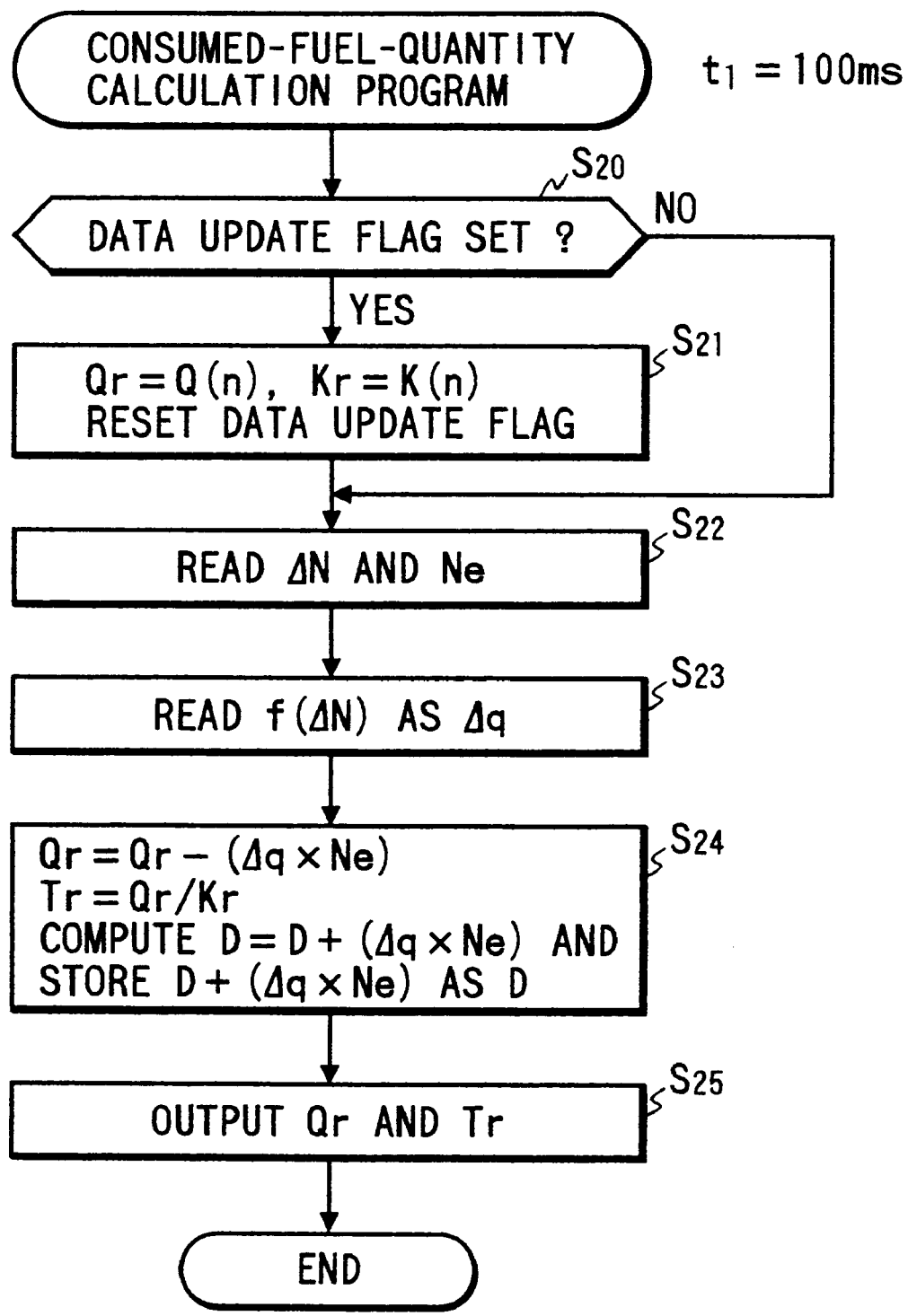
FIG. 6 is a flow chart illustrating operation of the arithmetic and logic unit under a consumed-fuel-quantity calculation program in the system of the present invention shown in FIG. 1.

The flow chart of FIG. 6 illustrates the consumed-fuel-quantity calculation program 123d for the estimation of a fuel consumption quantity in accordance with the present invention. Before describing this consumed-fuel-quantity calculation program 123d, a description will be made of a function f($\Delta N$), which is used in the program 123d and corresponds to the engine speed difference $\Delta N$, while referring to FIG. 5. In FIG. 5, inputted engine speed differences $\Delta N$ are plotted along the abscissa while fuel decreases $\Delta q$ are plotted along the ordinate. Points $A_{10}$, $A_{20}$ and $A_{30}$ correspond to the points $A_1$, $A_2$ and $A_3$ in FIG. 2. According to the illustrated characteristics, as the load applied to the engine 1 (the load on the hydraulic pump or pumps) increases, the engine speed difference $\Delta N$ also increases and at the same time, the fuel injection quantity (fuel consumption quantity $\Delta q$) of the fuel injection pump 1a also increases. When the engine speed difference $\Delta N$ reaches a constant value $\Delta No$ in this state, the fuel injection quantity does not increase any further and remains at the same level. From the foregoing, it is appreciated that the fuel decrease $\Delta q$ is a value substantially proportional to an output torque Te of the engine 1, in other words, a fuel consumption quantity of the engine 1 per revolution under a certain load condition. The function f($\Delta N$) can be readily obtained in advance through an experiment in which the engine 1 is subjected to a gradually increasing load. As an alternative, it can also be obtained without relying upon such an experiment, that is, by using data issued as a performance test data book by an engine maker.

Figure 7:
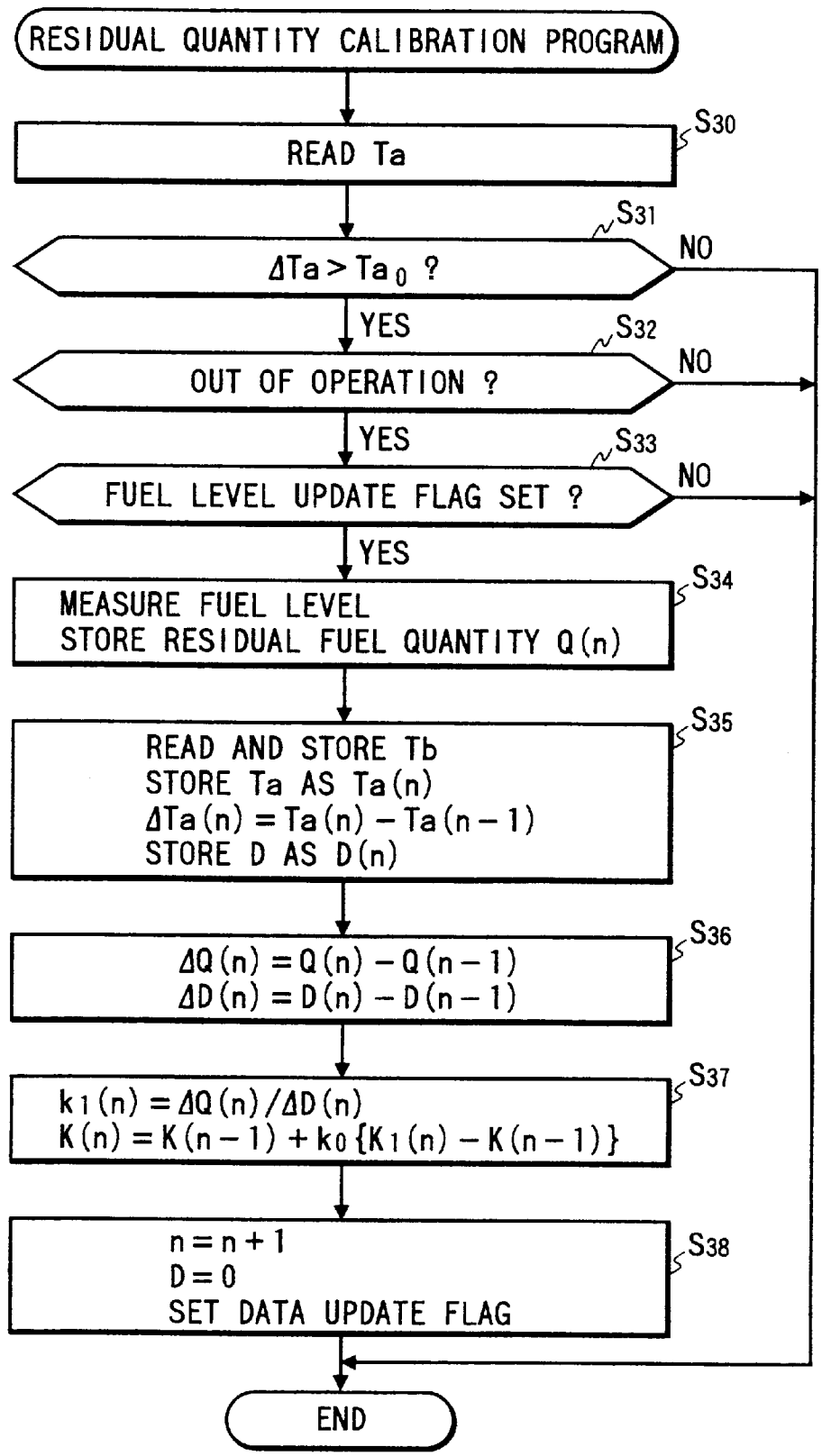
FIG. 7 is a flow chart illustrating operation of the arithmetic and logic unit in the system of the present invention shown in FIG. 1.

Now, the consumed-fuel-quantity calculation program 123d and the residual quantity calibration program 123c will be described with reference to the flow chart of FIG. 6 and that of FIG. 7, respectively.

The consumed-fuel-quantity calculation program 123d is a program for estimating a residual fuel quantity and residual service time upon an elapse of each predetermined short time after the measurement of a residual fuel quantity Q by the fuel level gauge 6. Incidentally, the measurement of a residual fuel quantity by the fuel level gauge 6 is performed under the residual quantity calibration program 123c at an interval of about 1 hour while the work vehicle is not moving. Further, the residual quantity calibration program 123c is a program for determining a fuel consumption quantity per hour by measuring the above-described residual fuel quantity and calibrating it in view of variations in fuel consumption estimated corresponding to variations in load.

The consumed-fuel-quantity calculation program 123d is executed at a constant interval $t_1$, for example, at a constant interval of 100 msec as shown in FIG. 6. First, CPU 122 determines whether or not a data update flag has been set (step $S_{20}$ in FIG. 6). This data update flag is a flag which is set when a residual fuel quantity is newly measured under the residual quantity calibration program 123c to be described subsequently herein. If it is determined that the data update flag has been set, that is, a residual fuel quantity has been measured newly, CPU 122 stores the newly-measured residual fuel quantity Q(n) as an actual residual fuel quantity, stores as a new correction factor Kr a correction factor K(n) obtained by the residual quantity calibration program 123c to be described subsequently herein, and resets the data update flag (step $S_{21}$). Incidentally, letter n indicates the number of calibrations performed under the residual quantity calibration program 123c. If the data update flag has not been set yet, in other words, if measurement of a new residual fuel quantity has not been conducted yet, the processing of step $S_{21}$ is not performed.

CPU 122 next executes the input program 123a, whereby an engine speed difference $\Delta N$ and an engine speed Ne at that time are read (step $S_{22}$). Based on the engine speed difference $\Delta N$ so inputted, CPU 122 reads a fuel decrease $\Delta g$ per revolution of the engine from the characteristics shown in FIG. 5 (step $S_{23}$). A product of the fuel decrease $\Delta q$ and the engine speed Ne (that is, a fuel consumption quantity at the engine speed Ne) is then subtracted from the residual fuel quantity Qr at the time of the preceding execution of the consumed-fuel-quantity calculation program 134d, so that a theoretical current residual fuel quantity Qr is calculated. The thus-obtained residual fuel quantity Qr is divided by a new correction factor Kr (which is equivalent to a fuel consumption quantity per hour) obtained under the residual quantity calibration program 123c to be described subsequently herein, whereby a new theoretical residual time Tr is calculated. Further, the current fuel consumption quantity (the product of the fuel decrease Δq and the engine speed Ne) is added to the integrated fuel consumption quantity D up to the preceding execution to compute a new integrated fuel consumption quantity D (step $S_{24}$). A residual fuel quantity Qr and residual service time Tr obtained as a result of the above computation are outputted to the display 13 (step $S_{25}$). By reading the residual fuel quantity Qr and the residual service time Tr always indicated on the display 13, especially the indicated residual service time Tr and taking into consideration a time required for refueling, the operator of the work vehicle makes a decision as to whether refueling should be requested or not.

Next, the residual quantity calibration program 123c will be described with reference to FIG. 7. This program 123c is executed at an interval of from about 100 to 200 msec. CPU 122 reads the current integrated engine operation time obtained under the worked-time measuring program 123b step $S_{30}$ in FIG. 7), and then determines whether or not an engine operation time ΔTa elapsed since an engine operation time up to the preceding calibration, which has already been obtained in step $S_{35}$ of the residual quantity calibration program 123c, has exceeded a preset time $Ta_o$ (step $S_{31}$). This preset time $Ta_o$ is set at about 1 hour. If the engine operation time ΔTa is equal to or shorter than the preset time $Ta_o$, the processing is ended. Otherwise, it is determined based on the operation signal C whether or not the work vehicle is currently in an operated state (step $S_{32}$), and it is also determined whether nor not a fuel level update flag has been set (step $S_{33}$). If at least one of the control levers has been operated and the work vehicle is in an operated state, the fuel level in the fuel tank 5 is moving up and down and the fuel level cannot be measured. Accordingly, the processing is ended. Further, the processing is also ended when the fuel level update flag has not been set yet.

If the fuel level has been determined to be measurable through the above-described steps $S_{32}$ and $S_{33}$, CPU 122 performs measurement of the fuel level and stores, as a currently-measured residual fuel quantity Q(n), an actual residual fuel quantity Q outputted from the converting device 11 at that time (step $S_{34}$). CPU 122 then reads a current time Tb from the timer 125 and stores the same, stores the integrated engine operation time Ta as a current integrated engine operation time Ta(n), subtracts an integrated engine operation time Ta(n−1) at the time of the preceding calibration from the current integrated engine operation time Ta(n) to compute an engine operation time ΔTa(n) from the preceding calibration to the current calibration, and further stores, as a current integrated fuel consumption quantity D(n), the integrated value D of fuel consumption quantity already obtained under the consumed-fuel-quantity calculation program 134d (step $S_{35}$).

Next, CPU 122 subtracts the residual fuel quantity Q(n−1) measured by the preceding calibration from the residual fuel quantity Q(n) measured by the current calibration to compute an actual fuel consumption quantity ΔQ(n) between the preceding calibration an the current calibration, and also subtracts the integrated value D(n−1) of fuel consumption quantity up to the preceding calibration from the current integrated value D(n) of fuel consumption quantity to compute a theoretical fuel consumption ΔD(n) between the preceding calibration and the current calibration (step $S_{36}$). Incidentally, the integrated value D(n−1) of fuel consumption quantity up to the preceding calibration is set at 0 in the below-described step $S_{38}$ of this program 123c. In the next step $S_{37}$, CPU 122 determines a ratio (first correction factor) $K_1(n)$ of the above-descried actual fuel consumption quantity ΔQ(n) to the above-described theoretical fuel consumption quantity ΔD(n). This first correction coefficient $K_1(n)$ is a value which indicates an actual consumption quantity for an integrated value of an average unit fuel consumption quantity from the time of the current calibration to about 1 hour before the current calibration. CPU 122 then computes a second correction factor K(n) by using the thus-obtained first correction factor $K_1(n)$. In this computation, a constant $k_o$ is a positive number not greater than 1.

The second correction factor K(n) is a median value between a second correction factor K(n−1) at the time of the preceding calibration and the first correction factor $K_1(n)$ at the time of the current calibration as is apparent from the formula shown in the chart. It is for the following reason that such a median value is calculated. Since the first correction factor K1(n) is changed every hour, the first correction factor $K_1(n)$ is considered to vary rather substantially. The calculation of such a median value is to reduce such variation s so that the variations are rendered gentler. A load exerted on the engine 1 may vary only slightly depending on the nature of work. In such a case, it is possible to set the constant $k_o$ at "1" so that the second correction factor K(n) becomes equal to the first correction factor $K_1(n)$. Further, to make variations gentler, it is possible to go back to the preceding execution of the processing of step $S_{36}$, its further preceding execution and so on, so that average values of the actual fuel consumption quantity ΔQ and the integrated fuel consumption quantity Δ(n) over a time as long as several hours can be obtained. Use of these average values makes it possible to omit the computation of the second correction factor K(n). The second correction factor K(n) determined as described above is stored as the correction coefficient Kr in step $S_{21}$ of the consumed-fuel-quantity calculation program 134d shown in FIG. 6 and is used for computation in step $S_{24}$ in the same program.

When the computation of the second correction factor K(n) has been ended, CPU 122, in preparation for the next measurement of the fuel level, then adds "1" to the preceding number of calibrations, resets the integrated fuel consumption quantity to "0", and further sets the data update flag (step $S_{38}$), whereby the processing is ended.

As has been described above, according to this embodiment, estimated fuel consumption quantities are successively subtracted at intervals of short times from an actual residual fuel quantity measured at a predetermined time interval to calculate residual fuel quantities upon elapse of the individual short times, the residual fuel quantity is divided by a correction factor to calculate residual service time, and these calculated values are shown on the display. The operator of the work vehicle is always aware of an accurate residual fuel quantity and residual service time, both of which vary moment by moment. As a consequence, reasonable refueling is feasible for the work vehicle. Even where the work truck is regularly visited by a tank truck, transmission of a residual service time to the tank truck by radio communication or the like makes it possible to perform extremely efficient refueling and hence to reduce the number of tank trucks and that of refueling staff. Further, variations are reduced and hence rendered gentler by the use of the second correction factor. This has made it possible to avoid abrupt variations in the residual fuel quantity and residual service time. The operator will no longer be surprised by such abrupt variations which he would otherwise encounter, thereby making it possible to conformably continue the work.

Further, if the current time Tb, the integrated engine operation time Ta(n), the integrated value ΔTa(n) of engine operation time from the preceding calibration to the current calibration, the integrated fuel consumption quantity D(n), the actual residual fuel quantity ΔQ(n) and the theoretical fuel consumption quantity ΔD(n) at the time of the current calibration, the first correction factor $K_1(n)$ and the second correction factor K(n) are stored in addition to the residual fuel quantity and the residual service time or if such data are transmitted by radiocommunication to a work supervising center (company) whenever calibration is conducted, the work supervising center can obtain processed data for management purposes on the basis of the thus-transmitted data. For example, it is possible to obtain a percentage of non-working time from the current time Tb and the integrated engine operation time Ta(n) or to evaluate the execution of the work from the standpoint of the fuel consumption quantity of the work vehicle at each time point in view of the histories of the engine operation time ΔTa, the actual residual fuel quantity ΔQ(n) at the time of calibration, the theoretical fuel consumption quantity ΔD(n) and the second correction factor K(n). Further, if the actual residual fuel quantity ΔQ(n) at the time of calibration is large although the theoretical fuel consumption quantity ΔD(n) is small, in other words, if the first correction factor suddenly becomes large at a certain time point, the possibility of fuel leakage from the fuel tank or a fuel pipe can be presumed.

Figure 8:
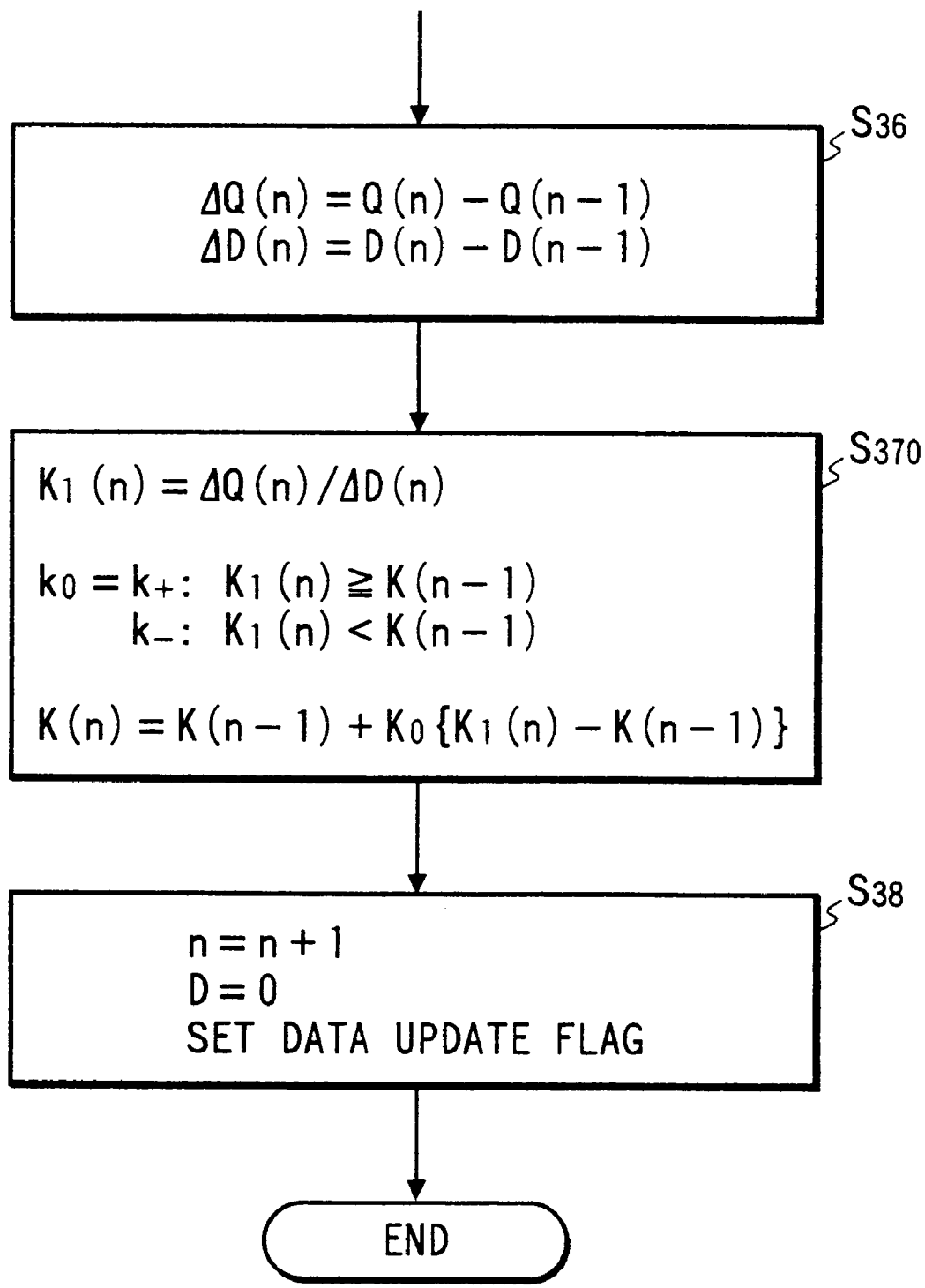
FIG. 8 is a flow chart illustrating operation of an arithmetic and logic unit in a system according to a second embodiment of the present invention for estimating residual service time of a work vehicle.

The flow chart of FIG. 8 illustrates operation of the system according to the second embodiment of the present invention for estimating residual service time of the work vehicle. In the first embodiment described above, the method for reducing abrupt variations by the use of the correction factor K(n) was adopted. However, even if the load on the work vehicle changes from a light load to a heavy load when the fuel level has become low and the residual service time has been reduced to 2 to 3 hours, the theoretical fuel consumption quantity remains small in the first embodiment because the correction factor K(n) remains small. If the operator comfortably continues the work without any time pressure in the above-mentioned state, there is the potential inconvenience that the work vehicle would run out of fuel much earlier than estimated. This embodiment avoids the above-mentioned inconvenience and, when the load changes from a light load to a heavy load, the fuel decrease rate is brought closer to the calculated or theoretical value $K_1(n)$ more promptly so that the residual service time is displayed still more accurately.

This embodiment requires to modify only the step $S_{37}$ in the residual quantity calibration program 123c in the above-described first embodiment, and the remaining features of this embodiment are the same as those of the first embodiment. In FIG. 8, step $S_{370}$ is a procedure which corresponds to step $S_{37}$ in the first embodiment. In the second embodiment of the present invention, a first correction factor $K_1(n)$ is compared with a second correction factor K(n-1) in the preceding calibration after the first correction factor $K_1(n)$ has been computed. If the former is equal to or greater than the latter [$K_1(n) \geq K(n-1)$], the constant $k_o$ is increased but, if the former is smaller than the latter [$K_1(n) < K(n-1)$], the constant $k_o$ is decreased. Whichever the case may be, the constant $k_o$ is a positive number not greater than "1". In the chart, "$k_+$" indicates an increased constant $k_o$ whereas "$k_-$" shows a decreased constant $k_o$. The second correction factor K(n) is calculated using such a constant $k_o$.

As has been described above, residual service time is estimated on the basis of a value close to the first correction factor $K_1$ (i.e., a constant $k_o$ close to "1") in the second embodiment when the load exerted on the engine varies to have a greater value and hence to use up the fuel earlier. The second embodiment therefore can bring about the same advantages as the above-described first embodiment and moreover, can avoid estimating the residual service time shorter. The latter advantage can avoid the inconvenience that the operator of the work vehicle would request unnecessarily too early refueling.

Figure 9:
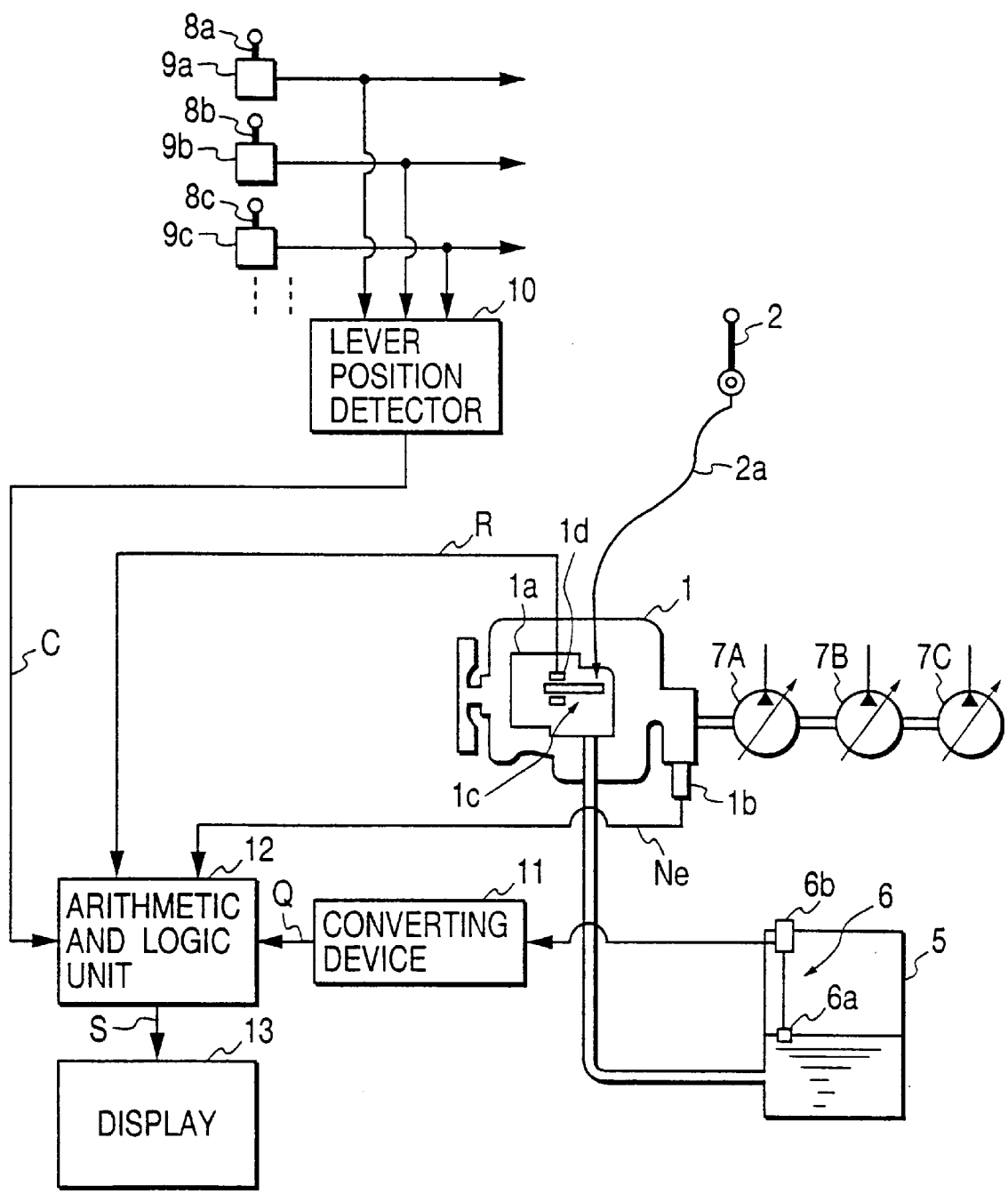
FIG. 9 is a block diagram of a system according to a third embodiment of the present invention for estimating residual service time of a work vehicle.

The block diagram of FIG. 9 illustrates the system according to the third embodiment of the present invention for estimating residual service time of the work vehicle. In the diagram, elements either identical or equivalent to the corresponding elements shown in FIG. 1 are indicated by like reference symbols, and their description is omitted herein. Numeral 1c indicates a toothed control rod (or control rack) of the fuel injection pump 1a. Designated at symbol 1d is a stroke sensor for detecting a displacement R of the toothed control rod 1c. The displacement R of the toothed control rod 1c, which has been detected by the stroke sensor 1d, is inputted to the arithmetic and logic unit 12. Designated at symbol 2a is a push-pull cable, which is connected at one end thereof to the target engine-speed setting lever 2 and at an opposite end thereof to an unillustrated input lever of the fuel injection pump 1a. This push-pull cable 2a transmits, to the input lever, a target engine speed Nr set by the target engine-speed setting lever 2.

A description will next be made of operation of the above-described second embodiment of the present invention.

In the first embodiment, the fuel consumption quantity Δq of the engine 1 per revolution was determined based on the engine speed difference ΔN while making use of the function f(ΔN) shown in FIG. 5. In this embodiment, however, a fuel consumption quantity Δq per revolution of the engine 1 is determined based on a displacement R of the toothed control rod 1c and an engine speed Ne instead of the engine speed difference ΔN while making use of a function g (R,Ne).

Figure 10:
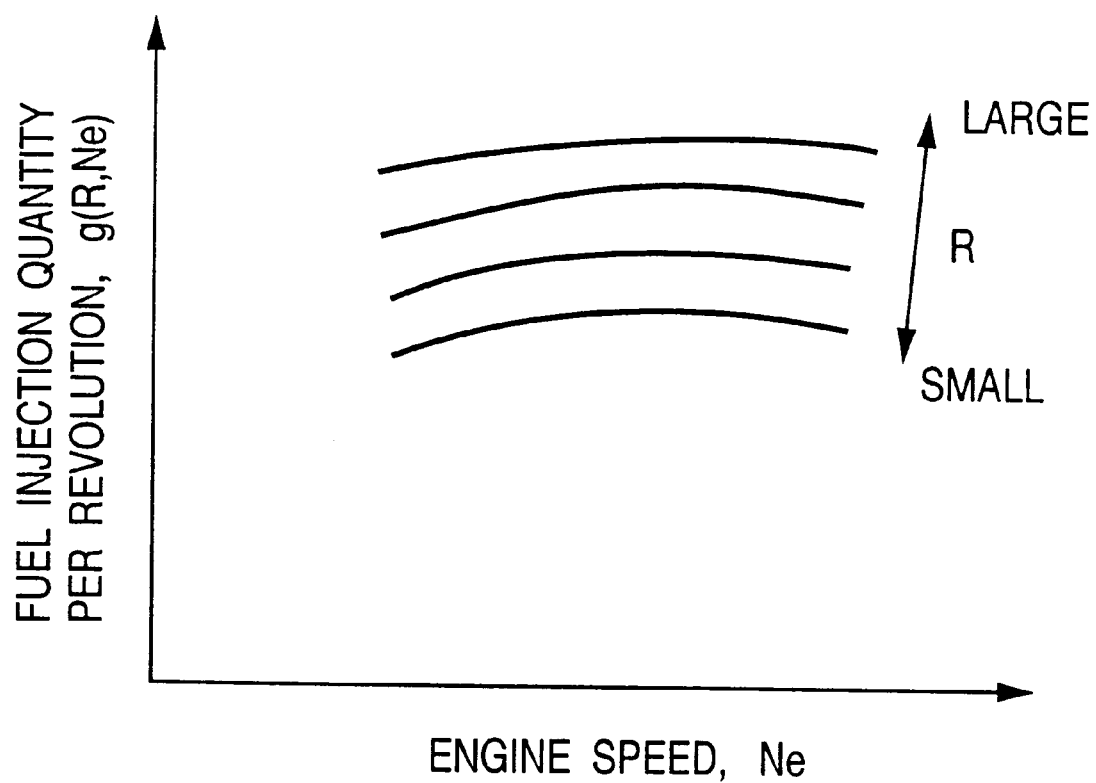
FIG. 10 is a characteristic diagram for use in the third embodiment of the present invention shown in FIG. 9, which illustrates fuel injection quantity as a function of engine speed.

FIG. 10 diagrammatically illustrates characteristics of the above-mentioned function g(R,Ne). In the diagram, engine speeds Ne are plotted along the abscissa while fuel injection quantities (fuel consumption quantities) per engine revolution are plotted along the ordinate. Their relationship varies depending on the magnitude of the displacement R of the toothed control rod 1c. As is indicated by an arrow in the diagram, the fuel injection quantity becomes greater with the displacement R of the toothed control rod 1c and the fuel injection quantity becomes smaller with the displacement R of the toothed control rod 1c. This function g(R,Ne) can also be obtained in a similar manner as the above-mentioned function f(ΔN).

This embodiment is different in operation from the first embodiment only in that a displacement R of the toothed control rod 1c and an engine speed Ne are read by the processing in step $S_{22}$ of the flow chart shown in FIG. 6 and a fuel consumption quantity Δq is determined by the processing of step $S_{23}$ from the function g(R,Ne) shown in FIG. 10. The remaining operation of this embodiment is the same as that of the first embodiment. Compared with the advantages of the above-described embodiments, the third embodiment has the additional advantage that it can perform a still more accurate estimation because a fuel consumption quantity is determined based on a displacement of the toothed control rod, said displacement being substantially proportional to the fuel consumption quantity.

Figure 11:
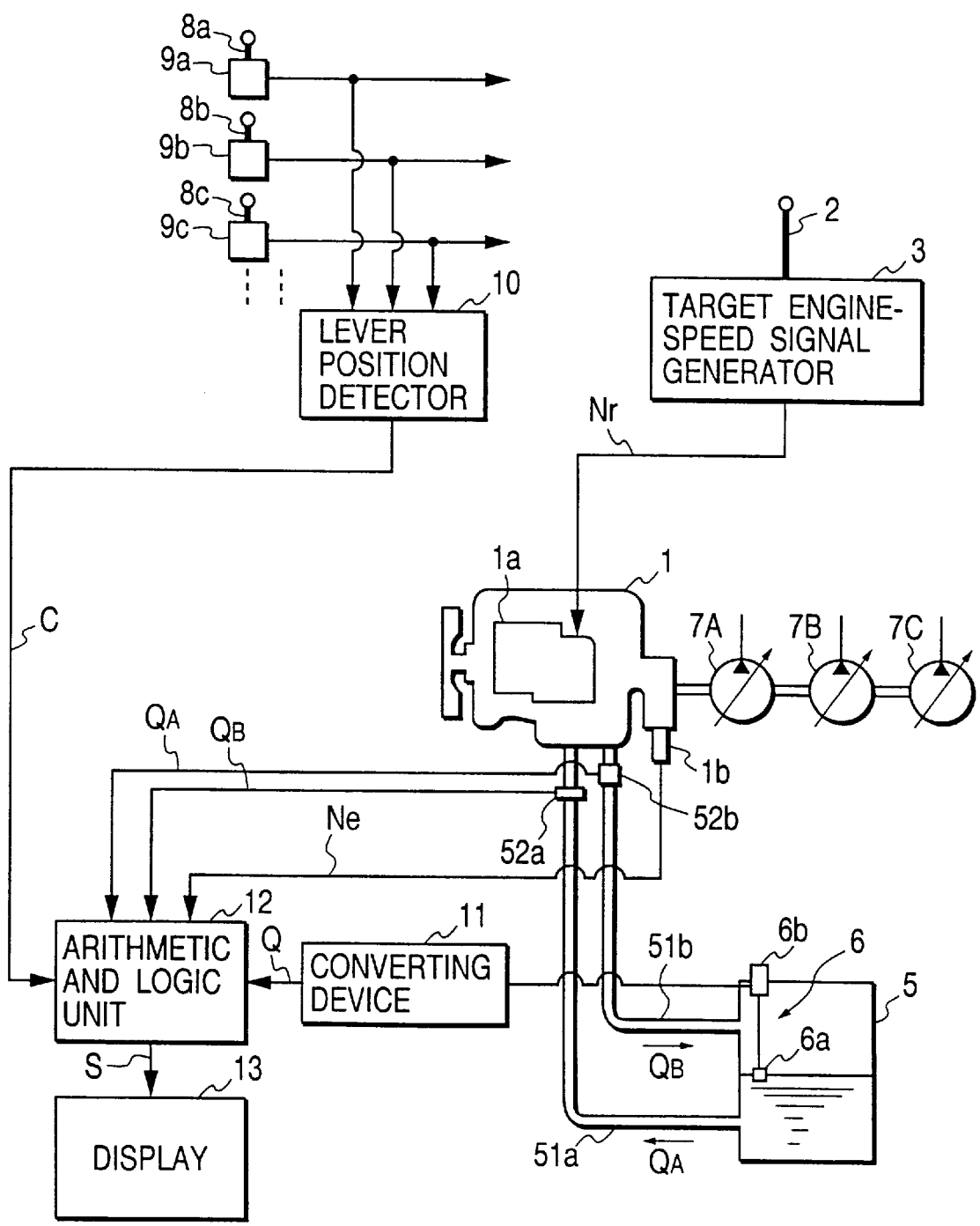
FIG. 11 is a block diagram of a system according to a fourth embodiment of the present invention for estimating residual service time of a work vehicle.

The block diagram of FIG. 11 illustrates the system according to the fourth embodiment of the present invention for estimating residual service time of the work vehicle. In the diagram, elements either identical or equivalent to the corresponding elements shown in FIG. 1 are indicated by like reference symbols, and their description is omitted herein. The diagram depicts a supply line 51a for supplying fuel from the fuel tank 5 to the fuel injection pump 1a, a return line 51b for returning to the fuel tank 5 fuel not consumed for explosion at the fuel injection pump 1a, a flow rate sensor 52a arranged in the supply line 51a for the detection of a supply fuel quantity $Q_A$, and a flow sensor 52b disposed in the return line 51b for the detection of a return fuel quantity $Q_B$. The supply fuel quantity $Q_A$ and return fuel quantity $Q_B$ detected at the flow rate sensors 52a, 52b, respectively, are inputted to the arithmetic and logic unit 12.

Operation of the above-mentioned fourth embodiment of the present invention will next be described with reference to the flow chart shown in FIG. 12.

The first embodiment adopted the method in which a fuel consumption quantity $\Delta q$ per engine revolution was determined based an engine speed difference $\Delta N$ by using the function $f(\Delta N)$ shown in FIG. 5 and a current residual fuel quantity Qr was determined by multiplying the thus-determined fuel consumption quantity $\Delta q$ with an engine speed Ne as shown in FIG. 6. In this embodiment, however, a fuel consumption quantity within a preset time (100 msec in the example shown in FIG. 6) is determined using a supply fuel quantity $Q_A$ and a return fuel quantity $Q_B$. The processing other than the processing for obtaining the fuel consumption quantity is the same as the processing in the first embodiment.

Figure 12:
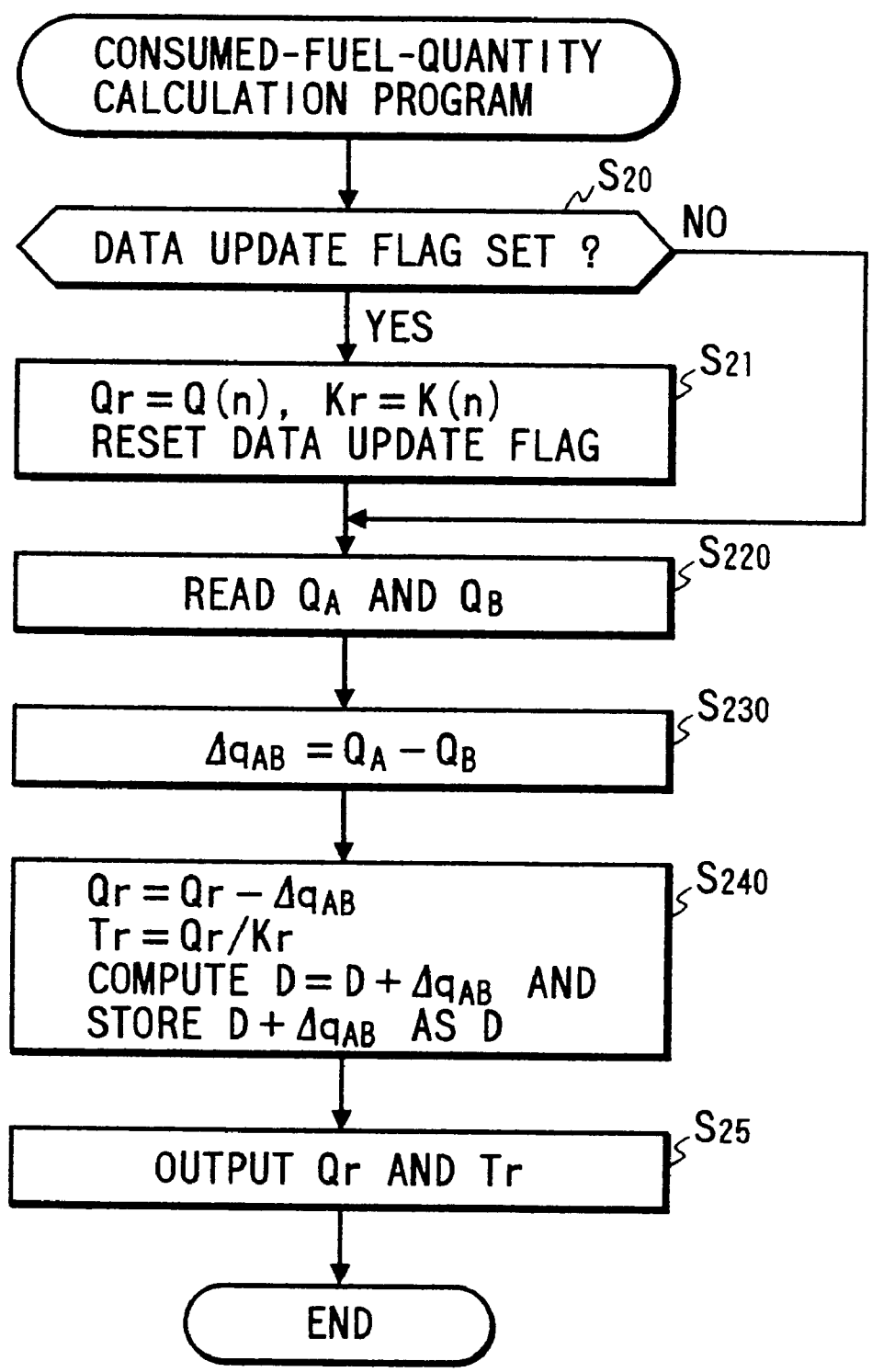
FIG. 12 is a flow chart illustrating operation of an arithmetic and logic unit in the system according to the fourth embodiment of the present invention shown in FIG. 11 for estimating residual service time of the work vehicle.

In FIG. 12, the same procedures as those illustrated in FIG. 6 are indicated by like symbols, and their description is omitted herein. By the processing of step $S_{220}$, CPU 122 executes the input program 123a and reads a supply fuel quantity $Q_A$ and a return fuel quantity $Q_B$. Then, the return fuel quantity $Q_B$ is subtracted from the supply fuel quantity $Q_A$ that a fuel consumption quantity $\Delta q_{AB}$ is determined (step $S_{230}$). Namely, the subtraction of the fuel quantity $Q_B$ returned to the fuel tank 5 from the fuel quantity $Q_A$ supplied to the fuel injection pump 1a of the engine 1 gives a fuel quantity consumed for explosion at the fuel injection pump 1a. In the next step $S_{240}$, CPU 122 subtracts the fuel consumption quantity $\Delta q_{AB}$, which has been determined above in step $S_{230}$, from the residual fuel quantity determined by the preceding calculation to determine a current residual fuel quantity Qr. This residual fuel quantity Qr is divided by the correction factor Kr to determine residual service time Tr. Further, the above-described fuel consumption quantity $\Delta q_{AB}$ is added to the integrated fuel consumption quantity up to the current calculation, whereby a current integrated fuel consumption quantity D is determined. The subsequent processing is the same as the processing in the first embodiment.

This embodiment can perform a still more accurate assumption because a fuel consumption quantity is determined based on a difference between the fuel quantities $Q_A$ and $Q_B$ which are substantially proportional to the fuel consumption quantity.

Figure 13:
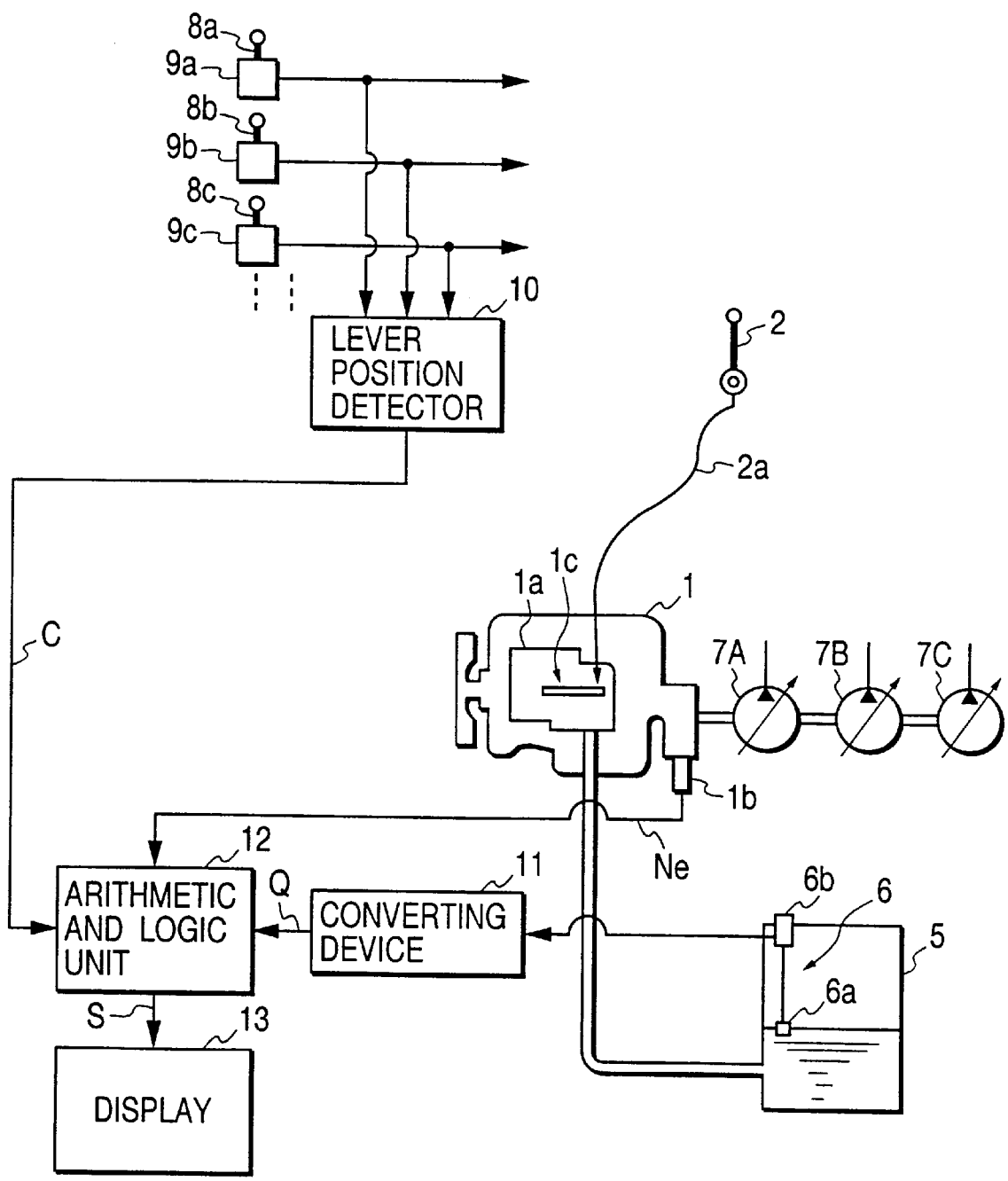
FIG. 13 is a block diagram of a system according to a fifth embodiment of the present invention for estimating residual service time of a work vehicle.

The block diagram of FIG. 13 illustrates the system according to the fifth embodiment of the present invention for estimating residual service time of the work vehicle. In the diagram, elements either identical or equivalent to the corresponding elements shown in FIG. 9 are indicated by like reference symbols, and their description is omitted herein. In this embodiment, a theoretical fuel consumption quantity is not determined based on an engine speed difference $\Delta N$, a displacement R of the toothed control rod or flow rates $Q_A$, $Q_B$ unlike the above-described embodiments but is determined based on a time during which each control lever is operated. Described specifically, a ratio ($K_A$) of an actual fuel decrease quantity to an operation time of the control lever during a predetermined time (for example, 1 hour) is employed as a fuel consumption quantity per unit service time. In this case, it is reasonable to determine the fuel consumption quantity on the basis of the operation time of the control lever insofar as loaded work (work requiring drive of the hydraulic actuator) is continued. In the case of the work vehicle, however, loaded work is not always continued, and the engine may still be in operation even during a non-working time such as a time during which the work vehicle is waiting for a dump truck. Taking this feature into consideration in this embodiment, a ratio ($K_B$) of an operating time of the control lever to an engine operation time is calculated, and this factor $K_B$ is used together with the factor $K_A$ for the calculation of a fuel consumption quantity and hence for the calculation of a residual fuel quantity and residual service time. In this embodiment, input signals to the arithmetic and logic unit 12 include only an operation-state signal C, an engine speed Ne and a residual fuel quantity Q as depicted in FIG. 13.

Figure 14:
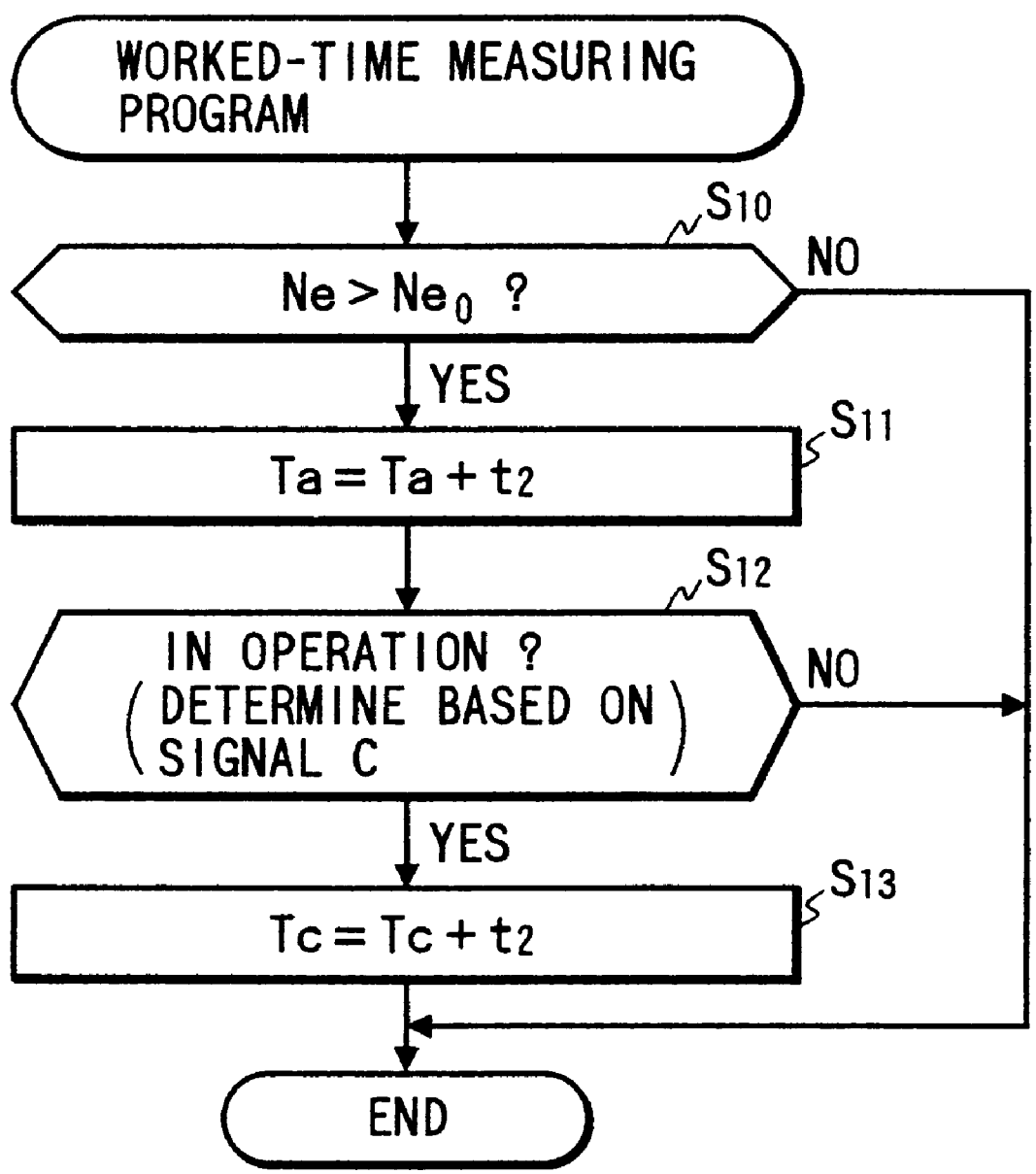
FIG. 14 is a flow chart illustrating operation of an arithmetic and logic unit in the system according to the fifth embodiment of the present invention shown in FIG. 13 for estimating residual service time of the work vehicle.

Operation of the above-described fifth embodiment of the present invention will next be described with reference to FIGS. 14, 15 and 16.

Operation of this embodiment is basically the same as in the first embodiment. Procedures under the worked-time measuring program 123b, the consumed-fuel-quantity calculation program 123d and the residual quantity calibration program 123c are performed. As is illustrated in FIG. 14, under the worked-time measuring program 123b ($t_2$=50–100 msec), an integrated value Ta of driven time of the engine is first determined similarly to steps $S_{10}$ and $S_{11}$ in the first embodiment shown in FIG. 4 (steps $S_{10}$ and $S_{11}$ shown in FIG. 14). Next, CPU 122 executes the input program to input an operation-state signal C, whereby it is determined whether or not any of the control levers is operated (step $S_{12}$). If operated, the time $t_2$ is added to the integrated value Tc of operation time until the preceding measurement and the sum is then stored as an integrated value Tc of operation time until the current measurement (step $S_{13}$), and the processing is then ended.

Figure 15:
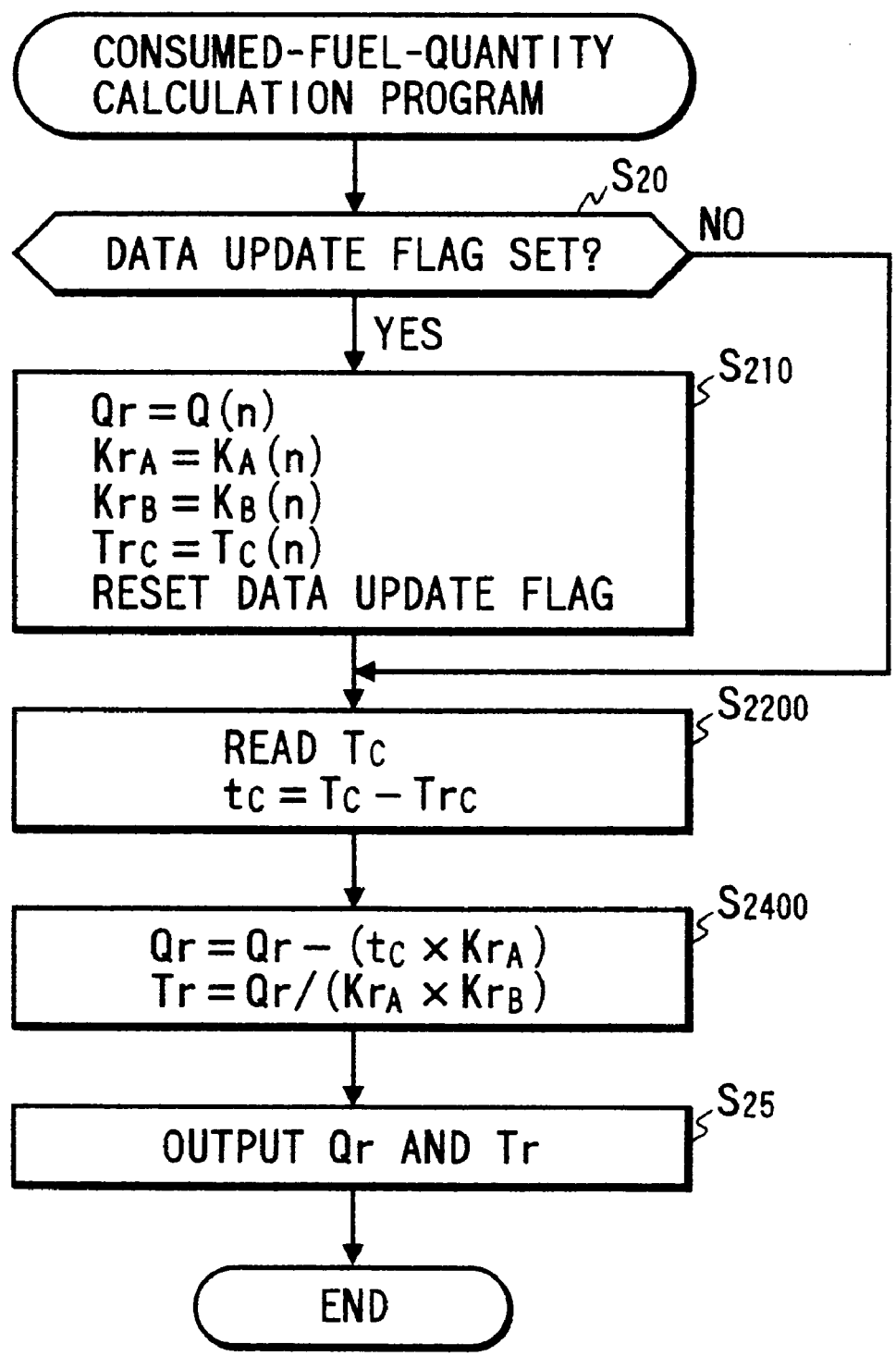
FIG. 15 is a flow chart illustrating operation of the arithmetic and logic unit under a consumed-fuel-quantity calculation program in the system according to the fifth embodiment of the present invention shown in FIG. 13 for estimating residual service time of the work vehicle.
Figure 16:
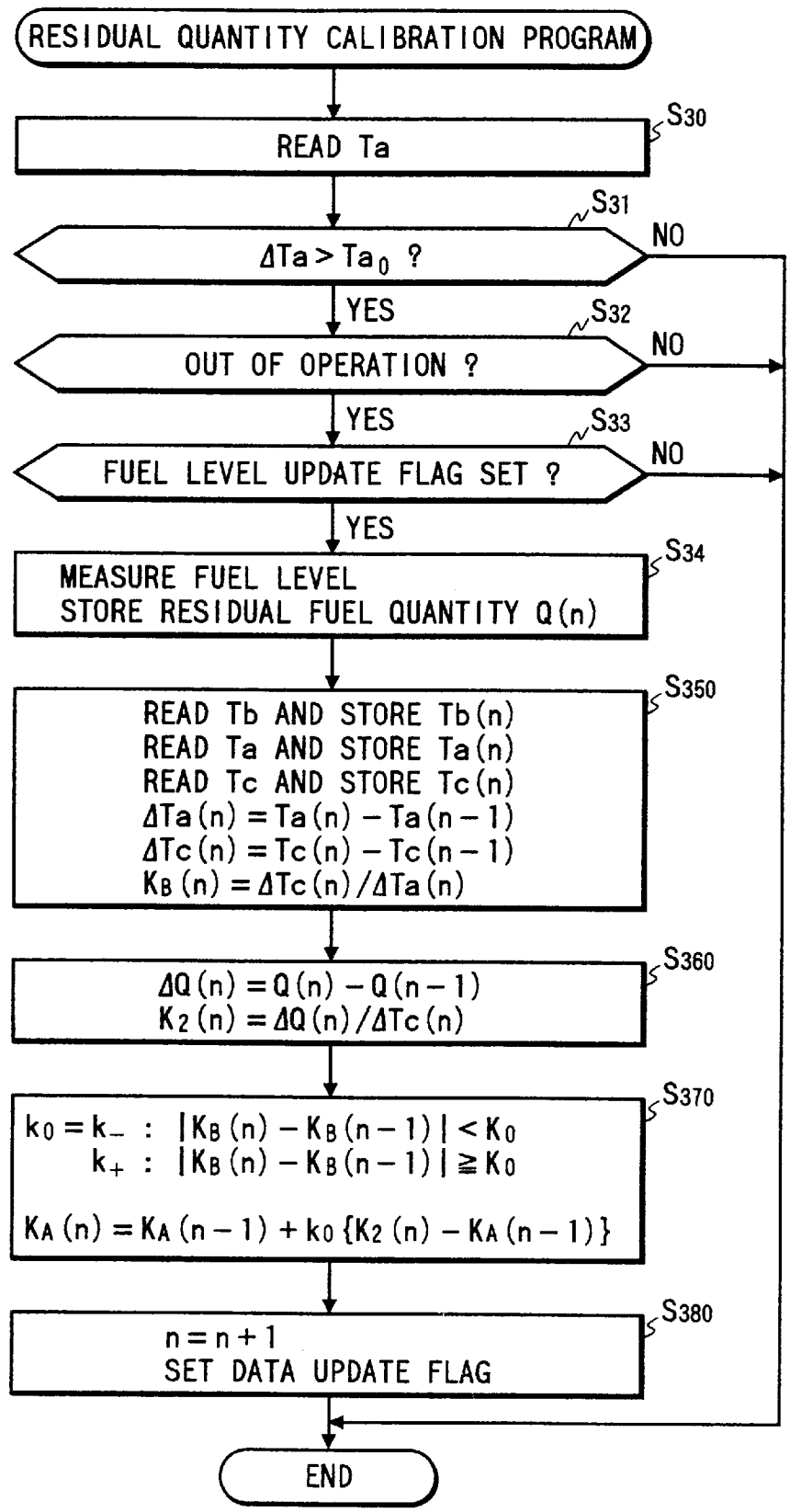
FIG. 16 is a flow chart illustrating operation of the arithmetic and logic unit under a residual quantity calibration program in the system according to the fifth embodiment of the present invention shown in FIG. 13 for estimating residual service time of the work vehicle.

Reference is next had to FIG. 15. Under the consumed-fuel-quantity calculation program 123d ($t_1$=100 msec), it is determined as in step $S_{20}$ of the first embodiment shown in FIG. 6 whether or not the data update flag has been set. CPU 122 then stores, as a residual fuel quantity Qr, a residual fuel quantity Q(n) determined by the current calibration under the residual quantity calibration program 123c to be described subsequently herein; as $Kr_A$, a fuel decrease percentage $K_A$(n) during the operation time of the control lever; as $Kr_B$, a ratio $K_B$(n) of the operation time of the control lever to the engine operation time; and as $Tr_C$, an integrated value Tc(n) of the operation time of the control lever at the time of calibration. The data update flag is then reset (step $S_{210}$). Next, an integrated value $Tr_C$ of operation time at the time of the calibration is subtracted from the integrated value Tc of operation time at the current measurement obtained under the worked-time measuring program 123b, so that an integrated value Tc of operation time after the calibration is determined (step $S_{220Q}$). Then, a product of the integrated value $t_c$ of operation time and the fuel decrease percentage $Kr_A$ (theoretical fuel consumption quantity) is subtracted from the residual fuel quantity Qr at the time of the calibration to compute a current residual fuel quantity Qr, and this residual fuel quantity Qr is divided by a product of the ratio $Kr_A$ and the ratio $Kr_B$ to determine residual service time Tr (step $S_{2400}$). The thus-obtained residual fuel quantity Qr and residual service time Tr are outputted to the display (step $S_{25}$). A calculation method of the residual service time, $Tr=Qr/(Kr_A \times Kr_B)$, will be described subsequently herein.

Under the residual quantity calibration program 123c, steps $S_{30}$ to $S_{34}$ from measurement of a fuel level until storage of a residual fuel quantity Q(n) at the time of the current calibration are the same as the corresponding steps in the first embodiment. CPU 122 then reads a time Tb, an engine driven time Ta and an operation time Tc at the time of calibration, and stores them as a time Tb(n), an engine driven time Ta(n) and an operation time Tc(n) at the time of the current calibration, respectively. CPU 122 also subtracts an engine driven time Ta(n−1) at the time of the preceding calibration from the engine driven time Ta(n) at the time of the current calibration to compute an engine driven time ΔTa(n) after the preceding calibration. CPU 122 also subtracts an operation time Tc(n−1) at the time of the preceding calibration from the operation time Tc(n) at the time of the current calibration to compute an operation time ΔTc(n) after the preceding calibration. Moreover, CPU 122 divides the operation time ΔTc(n) after the preceding calibration by the engine driven time ΔTa(n) after the preceding calibration to compute a proportion (ratio) $K_B(n)$ of the operation time in the service time (step $S_{35}$). Incidentally, the ratio $K_B(n)$ is evidently smaller than "1".

Next, CPU 122 subtracts a residual fuel quantity Q(n−1) at the time of the preceding calibration from the residual fuel quantity Q(n) at the time of the current calibration to compute an actual fuel consumption quantity ΔQ(n) during this period. This actual fuel consumption quantity ΔQ(n) is then divided by the operation time ΔTc(n) during the period, whereby a fuel consumption quantity $K_2(n)$ per operation time is computed (step $S_{360}$). To reduce scattering for gentler variations in the residual service time as in the first embodiment and also to avoid estimation of a shorter residual service time as in the second embodiment, the following step $S_{370}$ is then performed. Namely, CPU 122 stores the constant $k_o$, which is employed to determine a median value $K_A(n)$ of fuel consumption quantity per operation time, as a value k_ when an absolute value of a difference between a current ratio $K_B$ and a preceding ratio $K_B(n-1)$ is smaller than a predetermined, preset value $K_o$ but as a value $k_+$ when the absolute value of the difference between the current ratio $K_B$ and the preceding ratio $K_B(n-1)$ is equal to or greater than the preset value $K_o$. Computation is then performed in accordance with the formulas shown in step $S_{370}$, so that the median value $K_A(n)$ is calculated. This median value $K_A(n)$ is used as the fuel consumption quantity $Kr_A$ for the operation time, which is shown in FIG. 15. Next, "1" is added to the number n of calibrations, the data update flag is set (step $S_{380}$), and the processing is ended.

Here, a description will be made about the calculation method of the residual service time Tr, $Tr=Qr/(Kr_A \times Kr_B)$, in the processing of step $S_{2400}$ of the consumed-fuel-quantity calculation program 123d. In this embodiment, the residual service time Tr is basically obtained by dividing the theoretical residual fuel quantity Qr at the current time point with the fuel decrease percentage $Kr_A$ per unit operation time. Even while none of the control levers is operated, there is however a time in which the engine is in operation as mentioned above. The residual service time obtained as described above is therefore corrected further by dividing it with the ratio $K_B$ of the operated time of the control level to the operation time of the engine, whereby a residual service time Tr is determined. Namely, when the time in which the engine is in operation without operation of any of the control levers is long (for example, when the work vehicle has to await a dump truck for a long time), the fuel decrease percentage $Kr_A$ per operation time becomes large so that the residual service time becomes unreasonably smaller. In the above case, however, the ratio $Kr_B$ of the operation time of the control lever to the operation time of the engine (said ratio being always smaller than "1") becomes smaller, so that the residual service time—which has been obtained by dividing the theoretical residual fuel quantity Qr with the fuel decrease percentage $Kr_A$ per unit operation time—is corrected by dividing it with the above-described small value $Kr_B$. As a consequence, an adequate residual service time Tr is obtained.

In the case of work in which one or more of the control levers are operated during somewhat more than 90% of time in contrast to the above-described example, for example, in the case of work that earth and rocks are excavated after blasting in the above-mentioned strip mine or like work, an accurate residual service time Tr can be obtained by simply dividing a theoretical residual fuel quantity Qr with a fuel decrease percentage $Kr_A$ per unit operation time. This is evident because in the above case, the ratio $K_B$ of the operation time of the control lever to the operation time of the engine takes a value close to "1" and the division of the resulting residual service time Tr by the ratio $K_B$, which is close to "1", is practically meaningless. This means that depending on the nature of work, it may not always be necessary to divide the residual service time Tr, which has been obtained by dividing the theoretical residual fuel quantity Qr with the fuel decrease percentage $Kr_A$, with the ratio $K_B$.

In this embodiment, the computation of the residual service time uses neither engine-related values ΔN, R, Ne as in the first to third embodiments (the engine speed Ne is used only for the determination of operation of the engine) nor flow meters as in the fourth embodiment. It is therefore possible to determine residual service time still more easily. Further, correction is effected by the ratio $Kr_B$ of the control lever operation time to the engine operation time so that accurate residual service time can be obtained.

As has been described above, according to the present invention, a residual fuel quantity is measured upon an elapse of each predetermined time, an estimated fuel consumption quantity during a short time is subtracted from the residual fuel quantity upon an elapse of each short time to determine a current residual fuel quantity, and the current residual fuel quantity is divided by an estimated fuel consumption quantity per hour to determine residual service time. It is therefore possible to accurately estimate how many more hours a work vehicle can be operated for. This makes it possible to conduct reasonable refueling.

What is claimed is:

1. A system for estimating residual service time of a work vehicle, said system being arranged on said work vehicle having an engine, a fuel tank for storing fuel for said engine, a fuel meter for detecting a quantity of fuel in said fuel tank, an engine speed detector for detecting a speed of said engine, plural hydraulic pumps driven by said engine, a like plural number of hydraulic actuators driven by working oils delivered from said hydraulic pumps, respectively, and a like plural number of control levers for operating said hydraulic actuators, respectively, comprising:

first computing means for computing an actually-consumed fuel quantity of said engine on a basis of a measurement value of said fuel meter during a predetermined period;

second computing means for determining an estimated fuel consumption quantity of said engine during each predetermined short time starting after said predetermined period;

third computing means for subtracting said estimated fuel consumption quantity from said actually-consumed fuel quantity after an elapse of each predetermined short time, whereby a current residual fuel quantity is determined and then outputted;

fourth computing means for dividing said estimated fuel consumption quantity from said second computing means by a ratio of said actually-consumed fuel quantity to an integrated value of said estimated fuel consumption quantity during said predetermined period, whereby a current residual service time is determined and then outputted;

first correction means for computing, as a first correction factor, said ratio of said actually-consumed fuel quantity to an integrated value of said estimated fuel consumption quantity during said predetermined period; and second correction means for correcting an absolute value of said first correction factor determined by said first correction means, whereby a second correction factor is determined.

2. The system of claim 1, wherein said second correction means decreases said first correction factor when said ratio obtained during a current predetermined period is greater than a value of said first correction factor obtained by said first correction means in a preceding predetermined period, but increases said first correction factor when said ratio obtained in said current predetermined period is smaller than a value of said first correction factor obtained by said first correction means in said preceding predetermined period.

3. A system for estimating residual service time of an excavator, said system being arranged on said excavator having an engine, a fuel tank for storing fuel for said engine, a fuel meter for detecting a quantity of fuel in said fuel tank, plural hydraulic pumps driven by said engine, a like plural number of hydraulic actuators driven by working oils delivered from said hydraulic pumps, respectively, and a like plural number of control levers for operating said hydraulic actuators, respectively, comprising:

first computing means for computing an actually-consumed fuel quantity of said engine on a basis of a measurement value of said fuel meter during a predetermined period;

second computing means for determining an estimated fuel consumption quantity of said engine during each predetermined short time starting after said predetermined period;

third computing means for subtracting said estimated fuel consumption quantity from said actually-consumed fuel quantity after an elapse of each predetermined short time, whereby a current residual fuel quantity is determined and then outputted;

fourth computing means for dividing said residual fuel quantity by a ratio of said actually-consumed fuel quantity to a driven time of each of said hydraulic actuators during said predetermined period, whereby a current residual service time is determined and then outputted; and computing means for computing said ratio of said actually-consumed fuel quantity to said driven time of each of said hydraulic actuators during said predetermined period, whereby said residual service time is determined.

* * * * *